United States Patent [19]

Huffman

[11] 4,105,103

[45] Aug. 8, 1978

[54] CONVEYOR AND FEED CONTROL APPARATUS

[75] Inventor: Stanley S. Huffman, Golden, Colo.

[73] Assignee: Coors Container Company, Golden, Colo.LORADO

[21] Appl. No.: 806,525

[22] Filed: Jun. 14, 1977

[51] Int. Cl.² .............................................. B65G 11/20
[52] U.S. Cl. ..................................... 193/32; 188/1 R; 214/8; 221/307; 271/3.1; 271/18; 271/166
[58] Field of Search ................ 193/7, 40, 32; 221/303, 221/304, 307; 271/3.1, 18, 134, 165, 166; 214/6 D, 6 TS, 8; 188/1 R

[56] References Cited

U.S. PATENT DOCUMENTS

| 3,464,529 | 9/1969 | Horsky | 193/32 |
|---|---|---|---|
| 3,489,258 | 1/1970 | Stokes | 193/32 |

*Primary Examiner*—Bruce H. Stoner, Jr.
*Assistant Examiner*—Jeffrey V. Nase
*Attorney, Agent, or Firm*—Bruce G. Klaas

[57] ABSTRACT

Conveyor apparatus for conveying articles such as flat annular can ends and for controlling the rate of feed of the articles. The articles are transported through a conveying conduit defining an elongated passage with an inlet opening for receiving the articles and an outlet opening for discharging the articles. Feed control apparatus is associated with the conduit, preferably near the outlet opening, for controlling the rate of feed of the articles and comprises resilient liner means associated with the conduit means and located at least partially within the passage for frictionally engaging articles in the passage and controlling the rate of movement of the articles therethrough and force applying means associated with the resilient means for forcing the resilient means into frictional engagement with the articles in the passage. The force applying means is used to control the amount of friction exerted by the resilient means on the peripheral surface of the articles. The force applying means may be regulated and adjusted so that the articles exit from the conduit one at a time with a predetermined gap between adjacent articles, as stacks of a predetermined size or the movement of the articles within the conduit may be completely terminated whenever desired.

25 Claims, 4 Drawing Figures

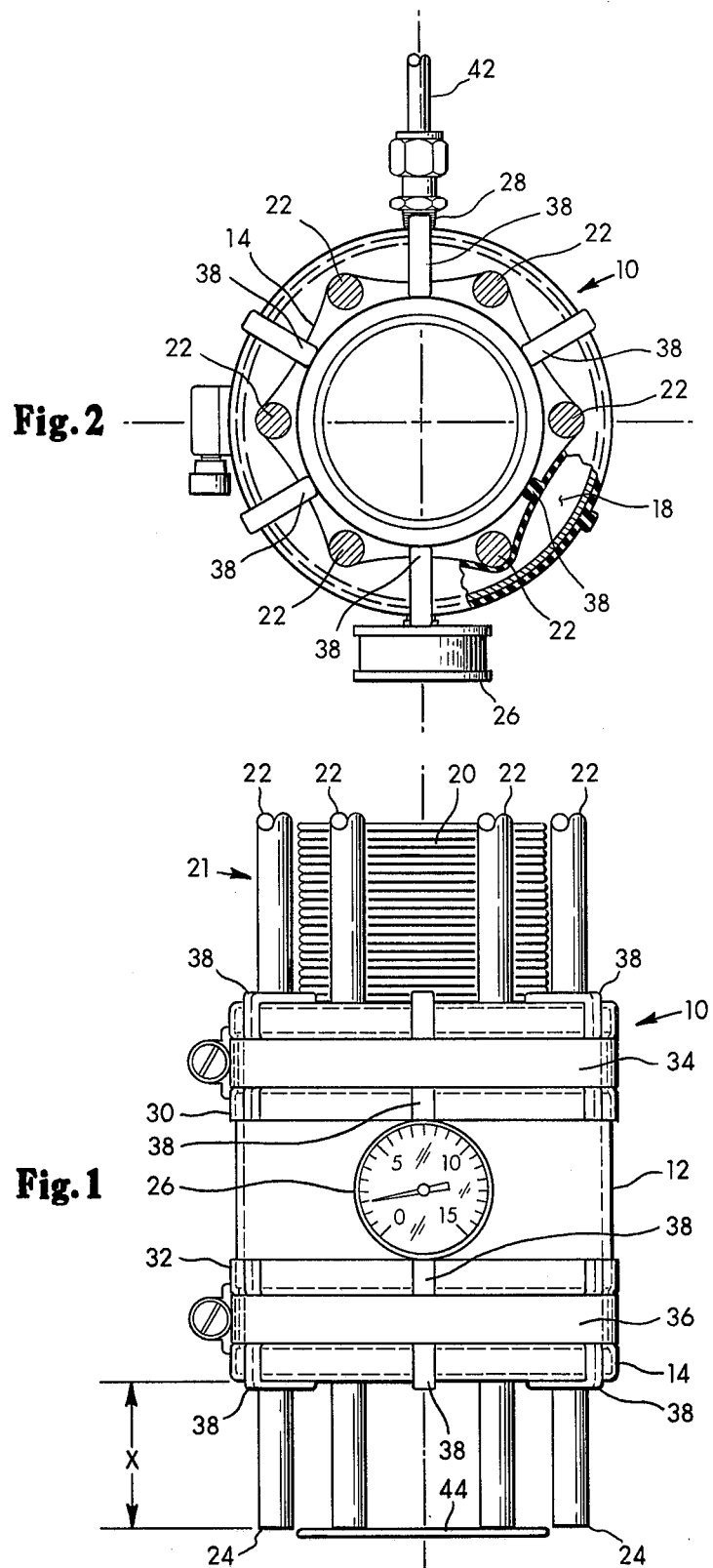

CONVEYOR AND FEED CONTROL APPARATUS

BACKGROUND AND SUMMARY OF THE INVENTION

This invention relates to conveyor apparatus, and, more particularly to conveyor and feed control apparatus for controlling the movement of articles (such as a stack of flat annular can ends) in a conveying conduit.

Diverse types of industries utilize conveying conduits such as tubular conveyors or chutes to transport various articles. In the manufacture and packaging of aluminum cans for instance, conveying apparatus having conduits are often used to transport can closure ends, and to feed the ends into various machines for performing operations such as seaming, bagging, or testing of the ends. The conduits are often formed from spaced parallel elongated rods which are welded to support struts to form a conduit passage having a generally circular cross-sectional configuration slightly larger than the circular peripheral configuration of the can ends. The peripheral surface of the ends are thus transversely confined in the conduit while being easily movable axially within the conduit. The can ends are stacked into the conduit through an inlet opening and may be pushed or pulled through the conduit passage to an outlet opening into a machine infeed or directly into the machine which is being fed. If the inlet opening is higher than the outlet opening the ends may move by gravity along through the conduit under the weight of the stack. In either case, the ends must exit from the conduit through the outlet opening and into feed apparatus associated with the machine, usually one at a time, but also in some cases, a stack at a time, at a rate consistent with the machine's operation.

In feeding the ends to some machine, if the force moving the ends through the conduit is relatively high, then the ends exiting from the conduit are tightly compressed and it is difficult for the feed apparatus of the machine to separate the ends for performing the required manufacturing operation. If the moving force is too low, then the ends may separate in the conduit and the feed rate into the machine is inconsistent. The ideal situation is for the ends to exit from the conduit one at a time at the desired rate and to feed directly into the machine feed or to stack loosely into the machine's infeed.

To obtain desired feed characteristics, prior art devices have utilized pairs of spring loaded rollers to frictionally engage and grip the peripheral edges of the can ends with the spring tension being adjustable to vary the amount of friction applied to the ends by the rollers. The spring tension on the rollers may be adjusted so that a stack of abutting ends moving through a set of rollers is spread out with spaces between adjacent ends. The ends can then be fed into a machine, such as a tester, one at a time.

Prior art devices of this type, however, have certain disadvantages. The rollers must be accurately positioned in the conduit and the spring tension on the rollers must be set exactly the same or uneven pressure is applied to the can ends. Uneven pressure causes an end to cock and jam between the rollers or in the conduit. Also, even if both rollers apply the same pressure, since pressure is usually only applied at two opposite peripheral portions of the end, the ends still often cock and jam between the rollers. The spring tension and positioning of the rollers therefore must be constantly maintained to insure that the rollers will function properly. In addition, spring loaded devices of this type provide no easy means for completely stopping the flow of ends in the conduit. If the flow of ends into the machine needs to be stopped, a separate brake mechanism is conventionally utilized.

The present invention provides conveyor apparatus with a feed control means that overcomes these prior art limitations and which comprises conveying conduit means defining an elongated passage for conveying articles therethrough; resilient liner means associated with the conduit means and adapted to be forced by fluid pressure into frictional engagement with portions of the peripheral surfaces of articles in the passage; and force applying means associated with the resilient liner means for forcing the resilient means into frictional engagement with articles in the passage. When there is no force or a relatively low level of force applied to the liner means, there is no friction between the liner means and the articles, and the articles will move freely through the conveying conduit means. A relatively high level of force may increase the friction between the liner means and the articles to the point where the feed control acts as a brake and the articles will not pass through. The force may also be regulated so that the friction is such that a gap is drawn between adjacent articles, and the articles exit from the feed control means one at a time for feeding into a machine.

Thus, with the apparatus of the present invention, the friction pressure exerted on the articles can be easily varied to provide an effective means for controlling the flow and feeding of articles in the conveying conduit. While the invention is particularly adapted for conveying articles such as can ends, some of the inventive concepts may be adapted to control movement of other articles such as cans, bottles, boxes, etc.

DESCRIPTION OF THE DRAWING

FIG. 1 is a front elevation view of can end conveyor and feed control apparatus constructed in accordance with the invention.

FIG. 2 is a plan view partly cut away, of the apparatus of FIG. 1.

DETAILED DESCRIPTION OF THE INVENTION

Figure 4:
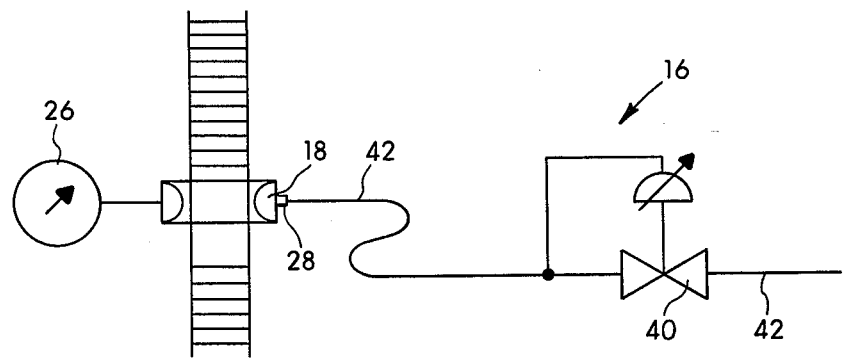
FIG. 4 is a schematic view of a fluid supply for the apparatus of FIG. 1.

In general, the feed control means 10 comprises support means in the form of an open ended elongated cylindrical support tube 12, resilient liner means in the form of a resilient one piece elongated liner 14, fitted on the inside of the support tube 12, and force applying means, generally shown at 16 in FIG. 4, for applying fluid force to the resilient liner means. The support tube 12 and the liner 14 define fluid chamber means, such as chamber 18, for receiving and holding pressurized fluid for forcing the liner 14 into frictional engagement with articles, such as a stack of can closure ends 20.

In the illustrative embodiment the feed control means is associated with conveying conduit means, in the form of a cage-like conveying conduit 21, defining an elongated passage for conveying articles, such as ends 20, therealong. A plurality, e.g., six, elongated rods 22 are attached to suitable gussets or supports (not shown) for forming the conduit 21. Rods 22 are arranged such that the center area of conduit 21 is slightly larger than the diameter of the ends 20, and the elongated passage is formed such that the ends are transversely retained but move easily axially within the conduit 21. The rods 22 may extend upwardly and terminate at a conduit inlet point (not shown) where the ends are fed into the conduit. The rods 22 may extend downwardly to a conduit outlet area 24, from which the ends 20 are fed into a machine or a machine feed or the like (not shown), such as a tester, or bagger. If the stack is in a vertical position as shown, with the inlet above the outlet, the ends will flow easily in the conduit above the feed control apparatus 10 under the weight of the stack. If the stack is in a horizontal position, or if the outlet is above the inlet, force can be applied at the upstream end of the stack 20 to move the ends through the conduit.

As shown in FIGS. 1 and 2, the support means, such as support tube 12, of the apparatus may be formed from a length of thin walled and cylindrical rigid tubing. On either side of the support tube 12 are through tapped holes (not shown) for attaching a fluid pressure guage 26 and a fluid inlet fitting 28 to the support tube 12.

Figure 3:
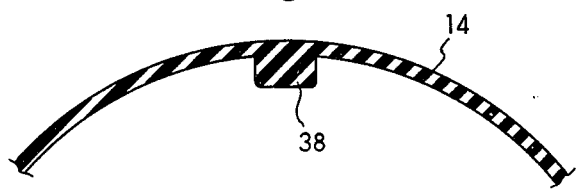
FIG. 3 is an enlarged partial plan view in cross section of the liner means of the apparatus of FIG. 1 showing the construction of the liner wear strips.

The resilient liner means, such as liner 14, preferably comprises a non-permeable section of resilient tubing material, such as butyl rubber. The liner 14 has a plurality of spaced wear strips 38 mounted on the inside surface thereof and extending axially therealong from end to end, six such strips being shown in the embodiment of FIGS. 1 and 2. As shown in FIG. 3, each wear strip 38 has a generally rectangular cross section which may be molded integrally with the liner 14, as shown, or otherwise mounted thereon for frictionally engaging the can ends 20, as hereinafter described in detail.

During assembly of the apparatus, liner 14 is stretched through the center of support tube 12 and the opposite ends 30, 32 of the liner are peeled back over the outside surface of the support tube 12. Clamp means, preferably in the form of worm drive band clamps 34, 36, are used to fasten the folded over ends 30, 32 of the liner 14 to the support tube 12. Two grooves (not shown) may be machined in the support tube 12 to retain the clamps 34, 36 on the support tube. After assemblage, a sealed fluid chamber 18 is formed between the support tube 12 and the liner 14. Pressurized fluid, such as air under pressure, can then be introduced into the chamber 18 for applying force to the liner and forcing wear strips 38 into frictional engagement with the can ends 20.

As shown in FIG. 4, the force applying means comprises a source of pressurized fluid (not shown) and a fluid supply line 42 connecting the source of pressurized fluid to the fluid chamber 18. Line 42 is connected at fluid inlet fitting 28 to the support tube 12. Preferably, the apparatus further comprises control means for varying the amount of force applied by the force applying means to the liner means whereby the friction between the liner means and the can ends is varied. As shown in FIG. 4, the control means comprises an adjustable fluid regulator 40 in the fluid supply line 42. Fluid flow is from the supply through the regulator 40 to the fluid inlet fitting 28 and the fluid chamber 18. Pressure guage 26 indicates the fluid pressure within fluid chamber 18. The preferred source of pressurized fluid is a source of pressurized air, although it is contemplated that other pressurized fluids, including other gases, liquids and finely divided solids, may be useful with the inventive concepts.

In order to mount the feed control apparatus 10 relative to conduit 21, the support tube 12, with the liner 14 mounted thereon, is placed over the rods 22 of the conduit. Fluid pressure is then applied to fluid chamber 18 and as shown in FIG. 2, the wall of liner 14 is outwardly deflected to grip rods 22, holding the feed control means 10 in place on the conduit 21. The feed control means 10 can be easily moved axially to another position on conduit 21 by releasing the fluid pressure and sliding the support tube 12 to a desired position.

OPERATION

As shown in FIG. 2, when fluid pressure is applied to chamber 18 wear strips 38 of the liner 12 are forced into the conduit passage for frictionally engaging the edges of the can ends 20. The amount of fluid pressure in fluid chamber 18 determines the frictional force that is applied by the wear strips 38 to the can ends 20.

In operation, the fluid pressure may be set at a level where the can ends 20 enter the feed control 10 in a tight stack but exit from the feed control with a gap between adjacent cans as illustrated in FIG. 1 wherein can end 44 has passed through the feed control with a gap X between it and the adjacent stack of ends. The gap dimension X is dependent on the frictional force applied by wear strips 38 to the ends 20 and thus the fluid pressure in chamber 18. The gap dimension is also dependent on the rate of infeed and outfeed from the conduit and on the moving force that moves the ends 20 through the feed control. If the conduit 21 is in the vertical position shown, the weight of the stack 20 above the feed control will usually be a sufficient moving force.

If the fluid pressure in chamber 18 and thus the friction force of wear strips 38 on the can ends is relatively high, in comparison to the moving force, the ends will not move through the conduit, and the feed control 10 will act as a brake. If the fluid pressure, and thus the friction force, is relatively low, in comparison to the moving force, the stack 20 will move easily through the feed control, and there will be no separation of the ends. Between these two extremes the fluid pressure may be set at a level to obtain any desired gap dimension. It has been determined that when the feed control means comprises a support tube fabricated from a 6" length of metal tubing and a molded butyl rubber liner having a durometer of 64 on the A scale, and when a stack of aluminum can ends is moved through the feed control means with a five pound moving force, then a fluid (air) pressure of 3psi will allow aluminum can ends to be released from the apparatus one at a time with a gap between the ends.

The fluid pressure then, may be regulated to obtain the desired end feed. If the ends need to be stacked one at a time into a machine feed or fed directly into a machine, with a particular gap the fluid pressure can be set to obtain this gap. If the ends need to be fed a stack at a time, the fluid pressure can be cycled so that the ends are allowed to flow through the apparatus in stacks.

If desired, conventional sensing devices such as photoelectric devices or proximity switches can be added to the circuit shown in FIG. 4 to automatically sense the gap dimension X or inventory stacks of ends into the machine infeed and operate a control responsive air regulator.

While the inventive concepts have been described hereinbefore in an illustrative embodiment thereof, for controlling the feed of can ends, it is contemplated that the inventive concepts may be adapted, changed, and modified for use in controlling the feed of other articles and it is intended that the appended claims be construed to cover any such adaptations, changes and modifications, except as limited by the prior art.

What is claimed is:

1. Apparatus for conveying and controlling movement of disk-like conveyed articles having a circular outer peripheral portion, such as can end members or the like, comprising:
   conveying conduit means, defining an elongated passage for conveying the articles therealong, having a plurality of equally circumferentially spaced elongated rigid guide members having innermost peripheral surfaces located along and defining an elongated guideway of generally circular cross-section for controlling passage of the articles therethrough in stacked abutting relationship therein with the outer peripheral surface portions of the articles having a diameter approximately equal to but sufficiently less than the diameter of the guideway defined by said elongated guide members for enabling free slidable movement relative thereto;
   resilient means associated with the conveying conduit means and located at least partially within the guideway for frictionally engaging articles in the passage and for controlling the rate of movement of articles along the passage, and being mounted outwardly of and circumjacent to and supportively engageable with the outermost peripheral surfaces of said elongated guide members and extending therearound and enclosing the guideway for inflation and resilient radially inward expansion against said outermost peripheral surfaces of said elongated guide members and into said guideway between said elongated guide members with equally circumferentially spaced portions thereof extending inwardly beyond the innermost peripheral surfaces of said elongated guide members for restrictive frictional engagement with equally circumferentially spaced outer peripheral portions of the articles in the guideway to control the movement of the articles through the guideway; and
   fluid chamber means associated with the resilient means to define an annular fluid chamber therearound for receiving and holding fluid pressure for forcing the resilient means into frictional engagement with the articles in the passage.

2. The apparatus of claim 1 and further comprising fluid pressure control means associated with the fluid chamber means for varying the fluid pressure therein and controlling the frictional engagement of the resilient means whereby the rate of movement of the articles along the passage is controlled.

3. The apparatus of claim 1 further comprising:
   a support means for adjustably slidably mounting the resilient means and the fluid chamber means relative to the elongated guide members of the conveying conduit means.

4. The apparatus of claim 3 wherein the support means comprises a length of cylindrical rigid tubing mounted circumjacent said elongated rigid guide members and having end portions mounted thereon.

5. The apparatus of claim 4 wherein the resilient means comprises a length of flexible tubing mounted on the end portions of the rigid tubing and extending along the inside surface of the rigid tubing between the end portions thereof.

6. The apparatus of claim 5 wherein the fluid chamber means is formed between the outer surface of the resilient means and the inner surface of the rigid tubing by the mounting of the resilient means on the rigid tubing.

7. Apparatus for controlling the movement of articles in a conveying conduit having an elongated passage for conveying the articles therealong, comprising:
   resilient liner means for frictionally engaging the articles in the passage and for controlling the rate of movement of the articles through the passage;
   cylindrical rigid support means for supporting the liner means and for mounting the liner means relative to the conduit;
   fluid chamber means associated with the liner means for receiving and holding fluid under pressure;
   force applying means for supplying fluid under pressure to the fluid chamber;
   control means for varying the amount of friction placed on the articles by the liner means; and
   the liner means comprises flexible tubing with the ends turned back over and attached to the outside of the support means whereby the fluid chamber means is formed between the liner means and the support means.

8. The apparatus of claim 7 wherein the liner means further comprises spaced wear strips for frictionally engaging the articles.

9. The apparatus of claim 7 wherein the force applying means comprises:
   a fluid pressure supply; and
   a fluid supply line connecting the fluid supply to the fluid chamber means.

10. The apparatus of claim 9 wherein the fluid pressure supply is an air pressure supply.

11. The apparatus of claim 10 wherein the control means comprises a fluid regulator in the fluid supply line whereby fluid pressure in the fluid chamber means may be varied.

12. The apparatus of claim 7 wherein worm drive band clamps are used to attach the ends of the liner means to the support means.

13. An apparatus for controlling the movement of cylindrical can ends in a conveying conduit, comprising:
   support means for mounting the apparatus relative to the conduit and having an inner surface radially outwardly spaced from the conduit and extending axially between end portions thereof;
   resilient tubular liner means mounted along the inner surface of the support means for frictionally engaging the peripheral surfaces of the can ends in the conduit;
   the ends of the liner means being folded over the end portions of the support means and clamped to the outside of the support means to form a fluid chamber between the support means and liner means;
   force applying means for forcing the liner means into frictional engagement with the can ends; and
   control means for varying the amount of force applied by the force applying means to the liner means whereby the friction of the liner means with the can ends is varied.

14. The apparatus of claim 13 wherein the force applying means comprises:
   a fluid pressure supply; and
   a fluid supply line connecting the fluid supply to the fluid chamber.

15. The apparatus of claim 14 wherein the fluid pressure supply is an air pressure supply.

16. The apparatus of claim 14 wherein the control means comprises a fluid regulator in the fluid supply line whereby fluid pressure in the fluid chamber may be varied.

17. The apparatus of claim 13 wherein the liner means has equally spaced integrally molded wear strips on its inside surface extending axially from end to end for engaging the can ends.

18. The apparatus of claim 13 wherein the support means comprises a length of cylindrical rigid tubing.

19. The apparatus of claim 13 wherein worm drive band clamps are used to clamp the edges of the liner means to the support means.

20. The apparatus of claim 13 wherein the tubular liner means is formed out of molded butyl rubber.

21. The apparatus of claim 13 wherein equally spaced wear strips are integrally molded on the liner means.

22. Apparatus for conveying and controlling movement of disk-like conveyed articles having a circular outer peripheral portion, such as can end members or the like, comprising:
 a plurality of equally circumferentially spaced elongated rigid guide means having innermost peripheral surfaces located along and defining an elongated guideway of generally circular cross-section for controlling passage of the articles therethrough;
 resilient means mounted outwardly of and circumjacent to the guideway for resilient radially inward expansion into said guideway between said elongated guide means with equally circumferentially spaced portions thereof extending inwardly beyond the innermost peripheral surfaces of said elongated guide means for restrictive frictional engagement with equally circumferentially spaced outer peripheral portions of the articles in the guideway to control the movement of the articles through the guideway; and
 fluid chamber means associated with the resilient means for receiving and holding fluid pressure for forcing the resilient means into frictional engagement with the articles in the guideway.

23. The apparatus of claim 22 and further comprising fluid pressure control means associated with the fluid chamber means for varying the fluid pressure therein and controlling the frictional engagement of the resilient means whereby the rate of movement of the articles along the passage is controlled.

24. The apparatus as defined in claim 22 and further comprising:
 support means for adjustably slidably mounting said resilient means and said fluid chamber means relative to said guide means and for enabling adjustment of the operating position of said resilient means and said fluid chamber means relative to said guide means.

25. The apparatus as defined in claim 22 and wherein said resilient means comprising:
 an elongated sleeve member of one piece of resilient material of circular cross-sectional configuration and having an inner surface extending completely around said guide means with circumferentially spaced portions thereof between said guide means being engageable with the articles in the guideway.

* * * * *